(12) United States Patent
Asakura et al.

(10) Patent No.: US 9,544,502 B2
(45) Date of Patent: Jan. 10, 2017

(54) DARK EXPOSURE CONTROL DEVICE

(71) Applicant: PENTAX RICOH IMAGING COMPANY, LTD., Tokyo (JP)

(72) Inventors: Naoto Asakura, Chiba (JP); Yoshitaka Kimura, Saitama (JP); Kosei Kosako, Tokyo (JP)

(73) Assignee: PENTAX RICOH IMAGING COMPANY, LTD., Tokyo (JP)

( * ) Notice: Subject to any disclaimer, the term of this patent is extended or adjusted under 35 U.S.C. 154(b) by 238 days.

(21) Appl. No.: 13/761,460

(22) Filed: Feb. 7, 2013

(65) Prior Publication Data

US 2013/0201390 A1 Aug. 8, 2013

(30) Foreign Application Priority Data

Feb. 8, 2012 (JP) .................................. 2012-025574

(51) Int. Cl.
| | | |
|---|---|---|
| *H04N 5/238* | (2006.01) | |
| *H04N 5/235* | (2006.01) | |
| *H04N 5/361* | (2011.01) | |

(52) U.S. Cl.
CPC ............ *H04N 5/2353* (2013.01); *H04N 5/361* (2013.01)

(58) Field of Classification Search
CPC .... G03B 7/16; H04N 5/2353; H04N 2101/00; H04N 5/238; H04N 5/361
USPC ............................... 348/362–364, 366, 221.1
See application file for complete search history.

(56) References Cited

U.S. PATENT DOCUMENTS

| | | | | |
|---|---|---|---|---|
| 5,729,288 | A | 3/1998 | Saito | |
| 5,825,417 | A * | 10/1998 | Yoshida | 348/364 |
| 7,636,113 | B2 * | 12/2009 | Kato | 348/243 |
| 7,760,999 | B2 | 7/2010 | Karasawa | |
| 8,436,935 | B2 * | 5/2013 | Ueda et al. | 348/353 |
| 2002/0012053 | A1 * | 1/2002 | Yoshida | 348/243 |
| 2005/0046713 | A1 * | 3/2005 | Kato | 348/243 |
| 2011/0115966 | A1 * | 5/2011 | Ueda et al. | 348/345 |

FOREIGN PATENT DOCUMENTS

| | | |
|---|---|---|
| JP | 08-051571 A | 2/1996 |
| JP | 2002-135646 | 5/2002 |
| JP | 2006-109162 | 4/2006 |
| JP | 2008-172731 | 7/2008 |

OTHER PUBLICATIONS

Japanese Office Action for JP App. No. 2012-025574 dated Dec. 22, 2015, along with English-language translation thereof.

* cited by examiner

*Primary Examiner* — Twyler Haskins
*Assistant Examiner* — Carramah J Quiett
(74) *Attorney, Agent, or Firm* — Greenblum & Bernstein, P.L.C.

(57) ABSTRACT

A dark exposure control device comprises a dark exposure performing processor, an aperture-stop, and an aperture-stop driving processor. The dark exposure performing processor detects an image signal generated by an imaging device while the shutter is closed. The aperture-stop adjusts the amount of light incident on the imaging device. The aperture-stop driving processor adjusts the opening degree of the aperture-stop to smaller than the opening degree set for a main exposure while the dark exposure performing processor is operated.

12 Claims, 7 Drawing Sheets

DARK EXPOSURE CONTROL DEVICE

BACKGROUND OF THE INVENTION

1. Field of the Invention

The present invention relates to a device for controlling an exposure for an imaging device provided in a digital camera, and more particularly to a device for controlling a dark exposure in order to detect a noise component of an image signal caused by a dark current generated by the imaging device.

2. Description of the Related Art

A dark current is generated in an imaging device when the imaging device does not receive light. The longer the exposure time, the greater the influence on the photographed image. Conventionally, there is known a device in which a dark exposure is carried out every time a main exposure is performed, and image data obtained by the dark exposure is subtracted from image data obtained by the main exposure to reduce the influence of the dark current, as disclosed in U.S. Pat. No. 5,729,288.

In the dark exposure, the blockage of light may be insufficient when closing only the shutter. For example, when a car passes a place where astronomical photography is being carried out, if strong light from the headlights enters the camera body through the photographing lens, the light may leak into a light-receiving surface of the imaging device through the closed shutter. In a conventional single-reflex camera, a dark exposure is carried out while the mirror is moved down, and part of the light passing through the photographing lens is blocked by the mirror. Therefore, an amount of light entering the imaging device is relatively small. Conversely, in a mirrorless-type camera, which is a recent development, light passing through the photographing lens strikes the shutter directly, and thus the light may easily enter the imaging device.

SUMMARY OF THE INVENTION

Therefore, an object of the present invention is to provide a dark exposure control device that can dramatically reduce the amount of light entering the imaging device, even under a condition where strong light enters the photographing lens when a dark exposure is carried out.

According to the present invention a dark exposure control device is provided in a camera having an imaging device and a shutter for controlling the exposure of the imaging device, the dark exposure control device comprising a dark exposure performing processor, an aperture-stop, and an aperture-stop driving processor.

The dark exposure performing processor detects an image signal generated by the imaging device while the shutter is closed. The aperture-stop adjusts the amount of light incident on the imaging device. The aperture-stop driving processor adjusts the opening degree of the aperture-stop to smaller than the opening degree set for a main exposure while the dark exposure performing processor is operated.

BRIEF DESCRIPTION OF THE DRAWINGS

The object and advantages of the present invention will be better understood from the following description, with reference to the accompanying drawings in which.

DESCRIPTION OF THE PREFERRED EMBODIMENTS

Figure 1:
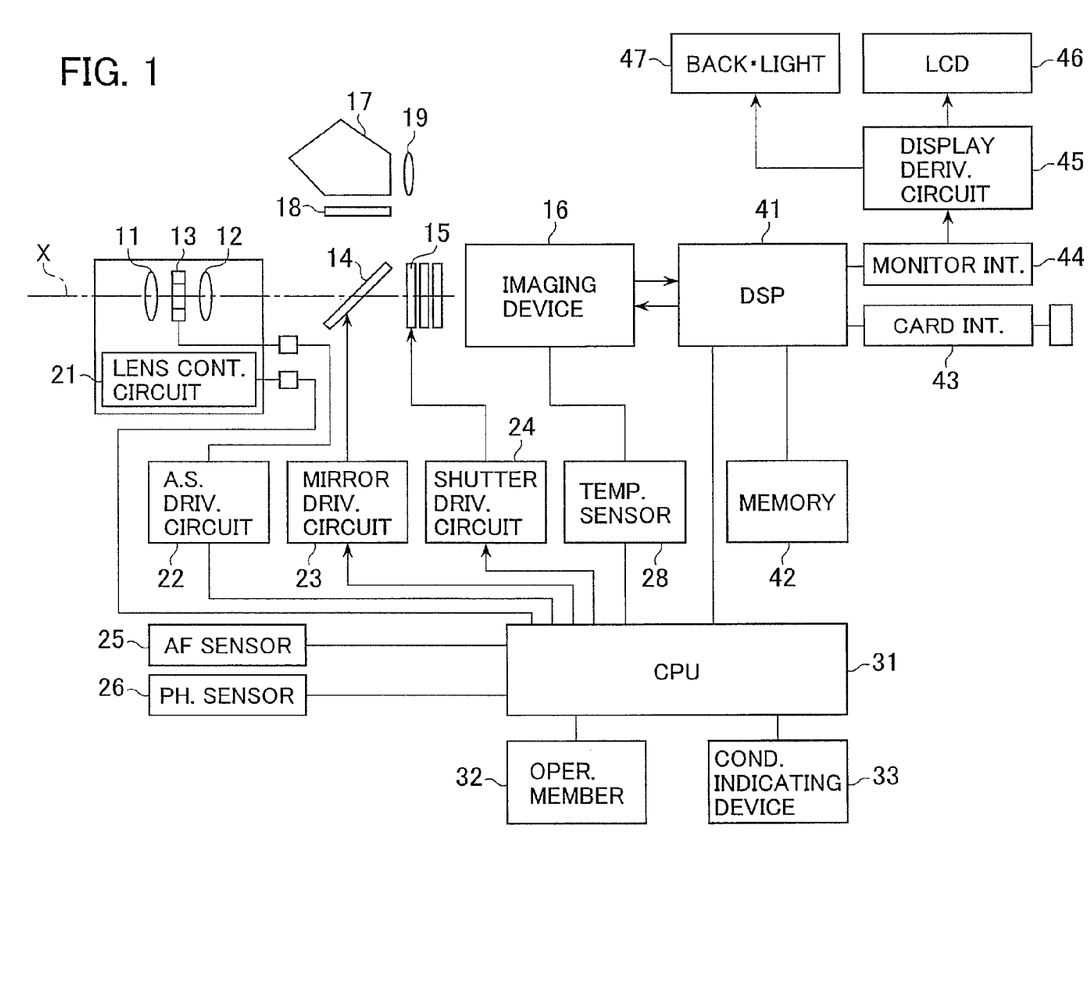
FIG. 1 is a block diagram of a single-reflex camera, which is common to the first through third embodiments of the present invention.

The embodiments of the present invention will be described below with reference to the drawings. FIG. 1 is a block diagram of the general structure of a single-reflex camera, which is common to the first through third embodiments of the present invention.

An aperture-stop 13 is provided between photographing lenses 11 and 12, and a mirror 14, shutter curtains 15, and an imaging device 16 are disposed behind the photographing lenses 11 and 12. A prism 17 is mounted above the mirror 14. A focusing screen 18 is provided under the prism 17, and an objective lens 19 is disposed behind the prism 17.

The position of the photographing lenses 11 and 12 on the optical axis is controlled by a lens control circuit 21, so that a focal adjustment and a zooming operation can be performed. The opening degree of the aperture-stop is adjusted by an aperture-stop driving circuit 22, so that the amount of light incident on the imaging device 16 can be adjusted. The mirror 14 is rotated by a mirror driving circuit 23, and the shutter curtains 15 are opened and closed by a shutter driving circuit 24. An in-focus state of the photographing lenses 11 and 12 is detected by an AF sensor 25, and the brightness of the photographed subject is detected by a photometry sensor 26. The signal detected by the AF sensor 25 and the photometry sensor 26 are input to the CPU 31. Based on these signals, the lens control circuit 21, the aperture-stop driving circuit 22, the mirror driving circuit 23, and the shutter driving circuit 24 are controlled, and thus photography is carried out.

An operation member 32 including a shutter button, a mode dial, and so on, and a condition-indicating device 33 such as a liquid crystal display, are connected to the CPU 31. By operating the operation member 32, not only is the photographing mode determined, but the shutter speed and the aperture value are set, and photography is performed. The photographing mode, the shutter speed, and the aperture value, which are set when the operation member 32 is operated, are displayed on the condition-indicating device 33.

A temperature sensor 28 is attached to a substrate of the imaging device 16, so that the temperature of the imaging device 16 can be detected and input to the CPU 31. The imaging operation of the imaging device 16, i.e., a charge-storage operation and read-out operation of the image signal, are controlled by an image processing circuit (DSP) 41, so that the image signal generated by the imaging device 16 during photography is subjected to predetermined image processing in the DSP 41.

A memory 42, a card interface 43, and a monitor interface 44 are connected to the DSP 41. A liquid crystal display driving circuit 45 is connected to the monitor interface 44, and a liquid crystal display (LCD) 46 and a backlight 47 are connected to the liquid crystal display driving circuit 45. The image signal, after being subjected to the image processing, is stored in the memory 42. It can also be recorded in a card memory (not shown) connected to the card interface 43 and indicated on the LCD 46.

Figure 2:
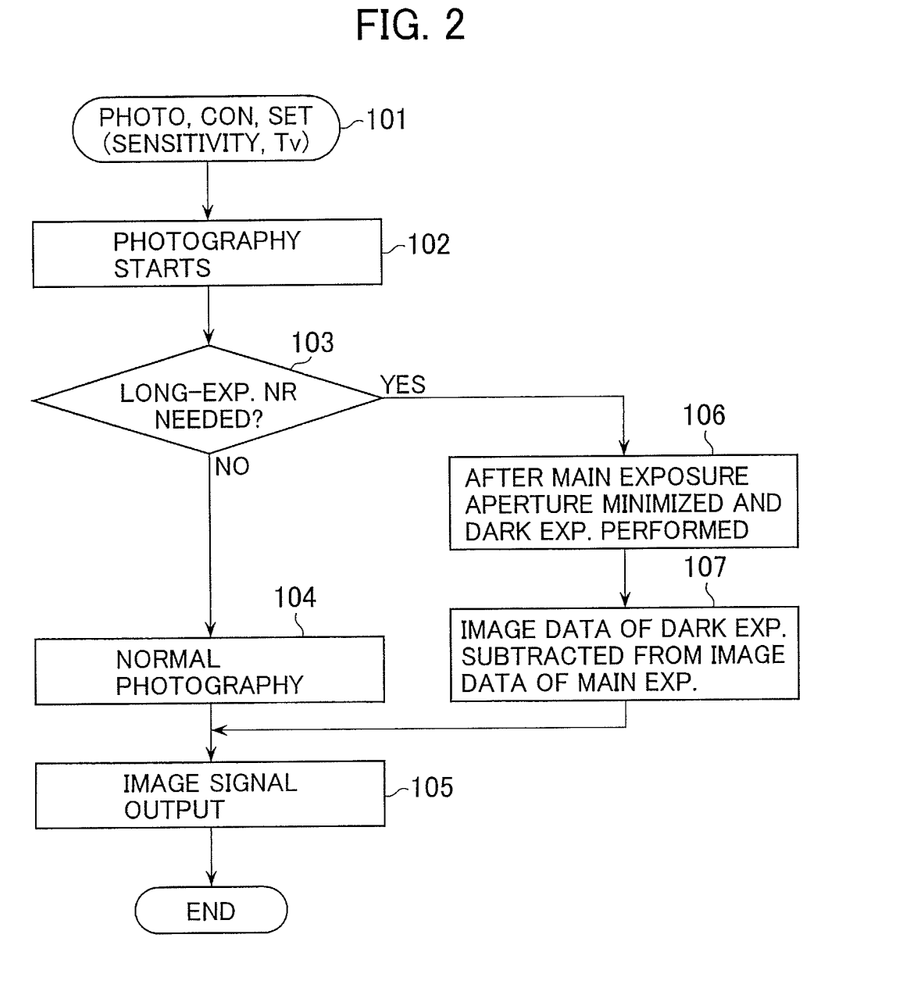
FIG. 2 is a flowchart of a control routine of a normal photographing mode in the first embodiment.

FIG. 2 is a flowchart of a control routine of a normal photographing mode in the first embodiment. In Step 101, photographing conditions, such as the sensitivity of the imaging device 16 and shutter speed (Tv) are set using the operation member 32. When the shutter button is fully depressed, Step 102 is executed to start photography. In Step 103, whether or not a long-exposure NR (i.e., noise reduction) process is needed is determined, based on the photographing conditions set at this time. Note that the photographing conditions include the exposure time (or shutter speed), sensitivity of the imaging device 16, and temperature of the imaging device 16. Further note that the long-exposure NR process is a control process carried out in order to remove a noise component from an image signal that is caused by a dark current generated by the imaging device 16 when photography is performed with over ten seconds of exposure time, for example, when the shutter curtains 15 are closed (i.e., a dark exposure). That is, the noise component is a pixel defect which cannot be reduced only by the DPS 41, and should be corrected by the long-exposure NR process.

When it is determined in Step 103 that the long-exposure NR process is not necessary, Step 104 is executed and only a main exposure is carried out. Namely, without performing the dark exposure, normal photography is carried out. In Step 105, an image signal is output from the imaging device 16 and subjected to image processing in the DSP 41, and thus photography is completed.

Conversely, when it is determined in Step 103 that the long-exposure NR process is needed, the process goes to Step 106, in which a main exposure is carried out, the opening degree of the aperture-stop 13 is minimized, and a dark exposure is performed. More specifically, following the main exposure the shutter curtains 15 are completely closed and the opening degree of the aperture-stop 13 is minimized so that the image signal, which is a noise component generated by the imaging device 16 while the shutter curtains 15 are closed, can be detected and output to the DSP 41. Note that, although the dark exposure time may be the same as that of the main exposure, it is possible that the dark exposure is shorter than the main exposure and the noise component corresponding to the main exposure time may be obtained by a calculation.

In Step 107, the image data of the main exposure is corrected in the DSP 41, in which the image data of the dark exposure (i.e., noise component) is subtracted from the image data of the main exposure. Step 105 is then executed to complete photography.

Figure 3:
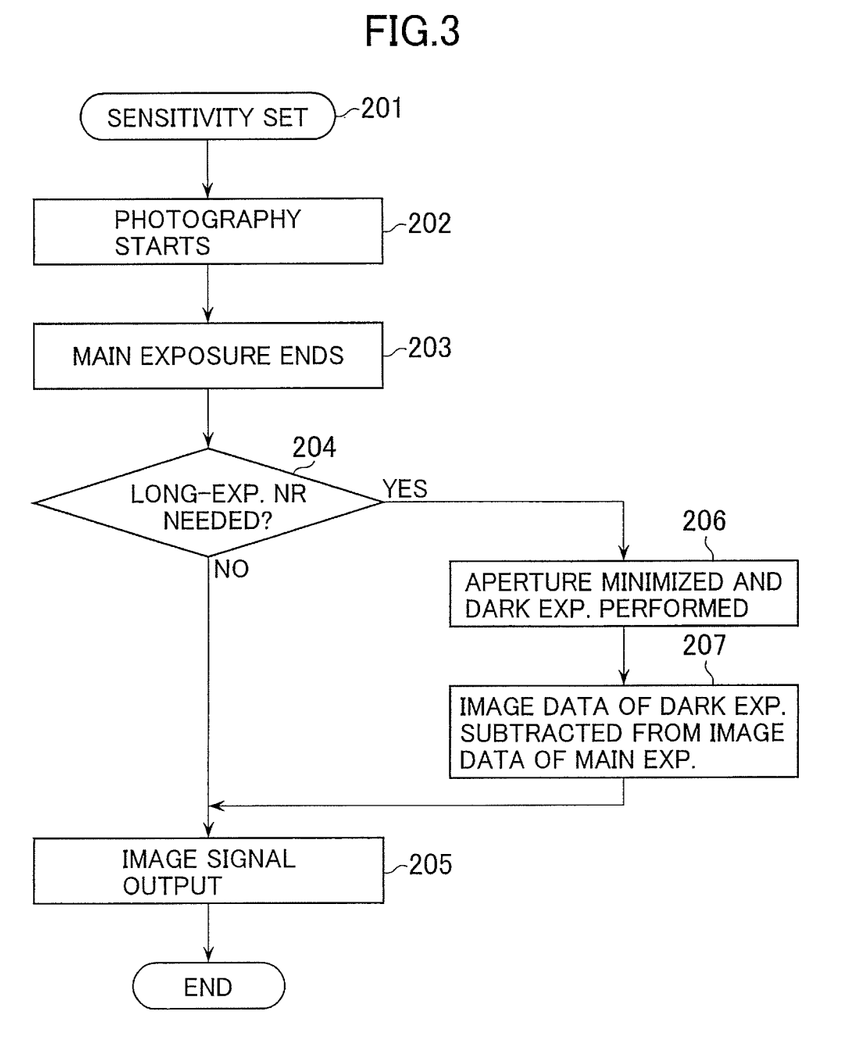
FIG. 3 is a flowchart of a control routine of a bulb photographing mode in the first embodiment.

FIG. 3 is a flowchart of a control routine of a bulb photographing mode in the first embodiment. In Step 201, the sensitivity of the imaging device 16 is set by using the operation member 32. When the shutter button is fully depressed, Step 202 is executed to start photography or achieve a main exposure. The main exposure continues as long as the shutter button is continuously depressed by the user, and when the shutter button is released, the main exposure ends at step 203.

In Step 204, it is determined whether or not a long-exposure NR process is needed, based on the photographing conditions. In this Step, the long-exposure NR process is deemed necessary if the main exposure time exceeds a predetermined value. That is, different from the normal photographing mode shown in FIG. 2, whether or not the dark exposure is to be performed is determined, based on only the exposure time of the imaging device 16. When it is determined that the long-exposure NR process is not needed, the control routine proceeds to Step 205 where an image signal is output from the imaging device 16, and image processing is performed in the DSP 41 to end the photographing operation.

Conversely, when it is determined in Step 204 that the long-exposure NR process is necessary, the control routine proceeds to Step 206 where the opening degree of the aperture-stop 13 is minimized and a dark exposure is performed. An image signal generated by the imaging device 16 during the dark exposure is detected and output to the DSP 41. In Step 207, the image data from the main exposure is corrected in the DSP 41, in which the image data from the dark exposure is subtracted from the image data of the main exposure. Step 205 is then executed to complete photography.

As described above, in the normal exposure shown in FIG. 2, whether or not the long-exposure NR process is performed is determined, based on the exposure time of the imaging device 16, the sensitivity of the imaging device 16, and the temperature of the imaging device 16. Conversely, in the bulb photographing mode shown in FIG. 3, whether or not the long-exposure NR process is performed in Step 204 is determined, based on only the exposure time of the imaging device 16.

The exposure time is the primary factor for determining the necessity of the long-exposure NR process, followed by the sensitivity and temperature of the imaging device 16, which are secondary to the exposure time. The parameters governing the necessity of the long-exposure NR process are stored in a memory provided in the camera, in a table format. The contents of the table are arranged such that, although the long-exposure NR process is carried out regardless of the sensitivity and temperature when the exposure time exceeds 30 seconds, the long-exposure NR process also tends to be carried out whenever the temperature is rising, even in the condition where the sensitivity is constant and the exposure time is less than 30 seconds.

As described above, in the first embodiment, since the opening degree of the aperture-stop 13 is minimized in the dark exposure, i.e., when the long-exposure NR is performed, even if light enters from outside of the camera, almost all of the light is blocked by the aperture-stop 13 and the amount of light that reaches the imaging device 16 through the closed shutter curtains 15, is dramatically reduced. Such an effect is remarkable especially in a mirrorless-type camera, and the quality of a photographed image obtained by a long-exposure photography is dramatically improved.

Figure 4:
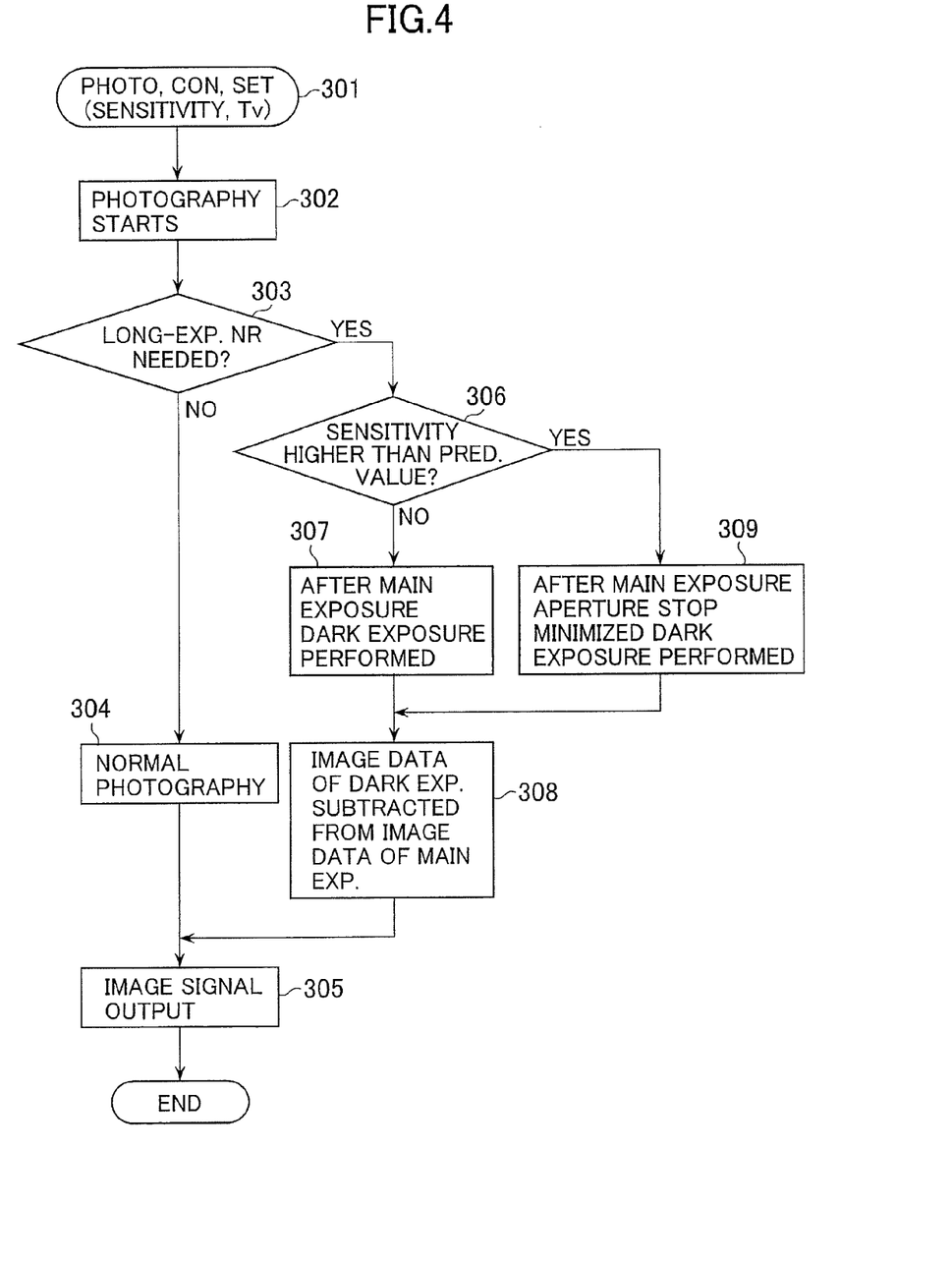
FIG. 4 is a flowchart of a control routine of a normal photographing mode in the second embodiment.

FIG. 4 is a flowchart of a control routine of a normal photographing mode in the second embodiment. In Step 301, photographing conditions, such as the sensitivity of the imaging device 16 and shutter speed (Tv), are set by using the operation member 32. When the shutter button is fully depressed, Step 302 is executed to start photography. In Step 303 whether or not the long-exposure NR is needed is determined, based on the photographing conditions. When it is determined in Step 303 that the long-exposure NR is not needed, Step 304 is executed to carry out only a main exposure. In Step 305, an image signal is output from the imaging device 16 and subjected to image processing in the DSP 41, and thus photography is completed.

Conversely, when it is determined in Step 303 that the long-exposure NR is necessary, the control routine proceeds to Step 306 where it is determined whether the sensitivity of the imaging device 16 is higher than a predetermined value (e.g., ISO1600). When the sensitivity of the imaging device 16 is less than or equal to a predetermined value, namely when the sensitivity is relatively low, dark current generated by the imaging device 16 is deemed to be relatively low and the control routine proceeds to Step 307 where a main exposure is carried out and a dark exposure is then performed while maintaining the opening degree of the aperture-stop 13. In Step 308, the image data of the dark exposure is subtracted from the image data of the main exposure in the DSP 41. Step 305 is then executed to complete photography.

When it is determined in Step 306 that the sensitivity of the imaging device 16 is higher than the predetermined value, the control routine proceeds to Step 309, where a main exposure is carried out, the opening degree of the aperture-stop 13 is minimized, and a dark exposure is performed. Steps 308 and 305 are then executed, and photography ends. Similarly to the first embodiment, although the dark exposure time may be the same as that of the main exposure, it is possible that the dark exposure time is shorter than that of the main exposure and the noise component corresponding to the exposure time of the main exposure may be obtained by a calculation.

Figure 5:
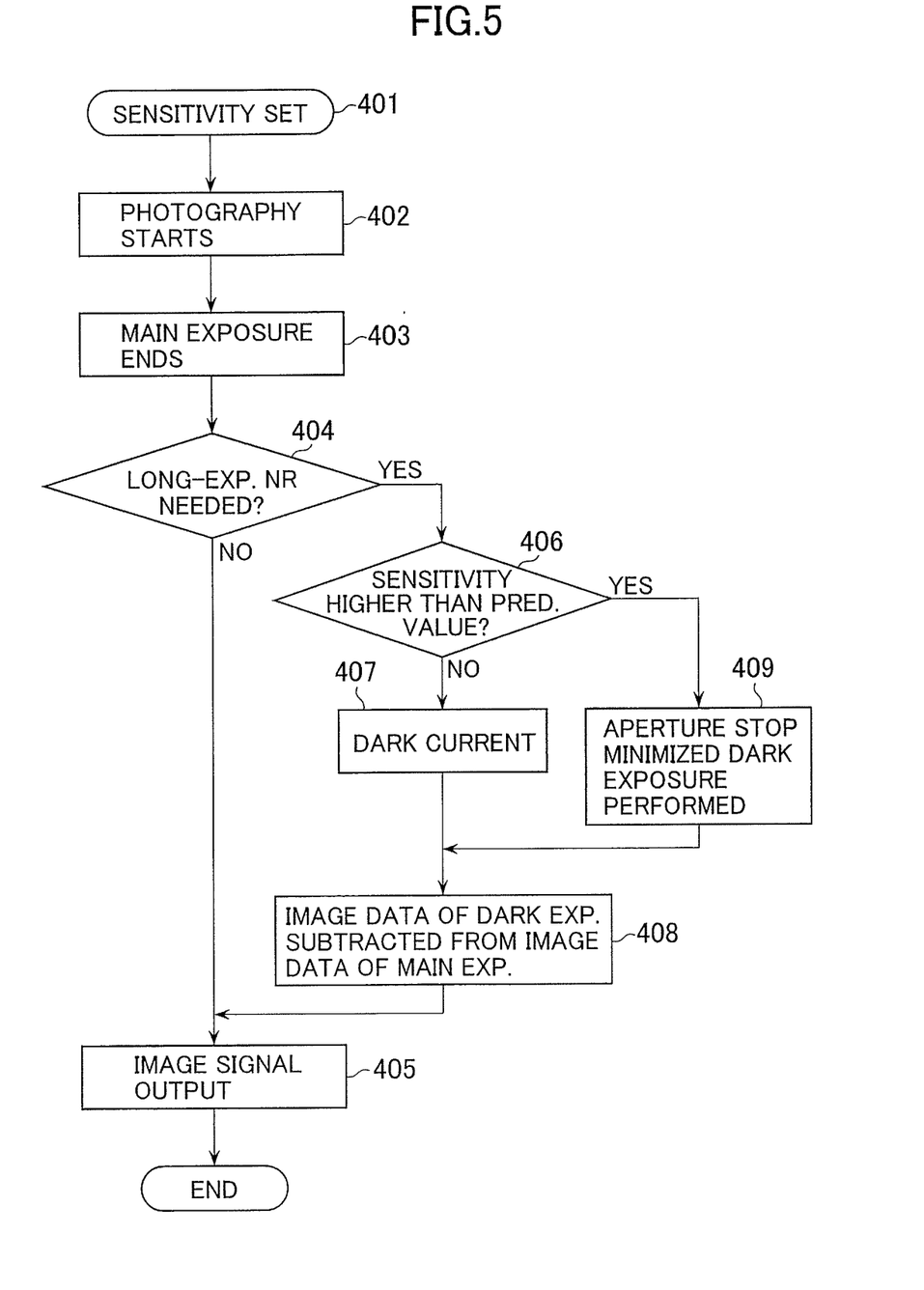
FIG. 5 is a flowchart of a control routine of a bulb photographing mode in the second embodiment.

FIG. 5 is a flowchart of a control routine of a bulb photographing mode in the second embodiment. In Step 401, the sensitivity of the imaging device 16 is set by using the operation member 32, and when the shutter button is fully depressed, the control routine proceeds to Step 402 where photography starts with a main exposure. When the shutter button is released, the control routine proceeds to Step 403 where the main exposure ends. In Step 404, whether or not a long-exposure NR is needed is determined based on the photographing conditions (i.e., the exposure time for the main exposure). When the exposure time is relatively short and it is determined that the long-exposure NR is not necessary, the control routine proceeds to Step 405 where an image signal is output from the imaging device 16, and image processing is performed in the DSP 41 to end photography.

When it is determined in Step 404 that the long-exposure NR is needed, the control routine proceeds to Step 406 where it is determined whether the sensitivity of the imaging device 16 is greater than a predetermined value (e.g., ISO1600). When the sensitivity of the imaging device 16 is less than or equal to the predetermined value, a dark current generated by the imaging device 16 is deemed to be relatively low and the control routine proceeds to Step 407 where a dark exposure is performed while maintaining the opening degree of the aperture-stop 13 set for the main exposure. The control routine then proceeds to Steps 408 and 405 to complete the photography.

Conversely, when it is determined in Step 406 that the sensitivity of the imaging device 16 is higher than the predetermined value, the control routine proceeds to Step 409 where the opening degree of the aperture-stop 13 is minimized, and a dark exposure is performed. At the same time, an image signal generated by the imaging device 16 is detected and output to the DSP 41. The control routine proceeds to Steps 408 and 405 and photography ends.

As described above, in the second embodiment, the value of the sensitivity of the imaging device 16 is checked in Steps 306 and 406. When the sensitivity of the imaging device 16 is relatively high, the amount of light leaking through the shutter curtains 15 is deemed to produce a dark current in the imaging device 16 large enough to affect the image quality, and thus the opening degree of the aperture-stop 13 is minimized. In other words, when the sensitivity of the imaging device 16 is relatively low, the opening degree of the aperture-stop 13 is maintained at the same degree as that of the main exposure, thereby allowing the frequency at which the aperture-stop 13 is driven to be reduced. The other operations and effects are identical to the first embodiment.

Figure 6:
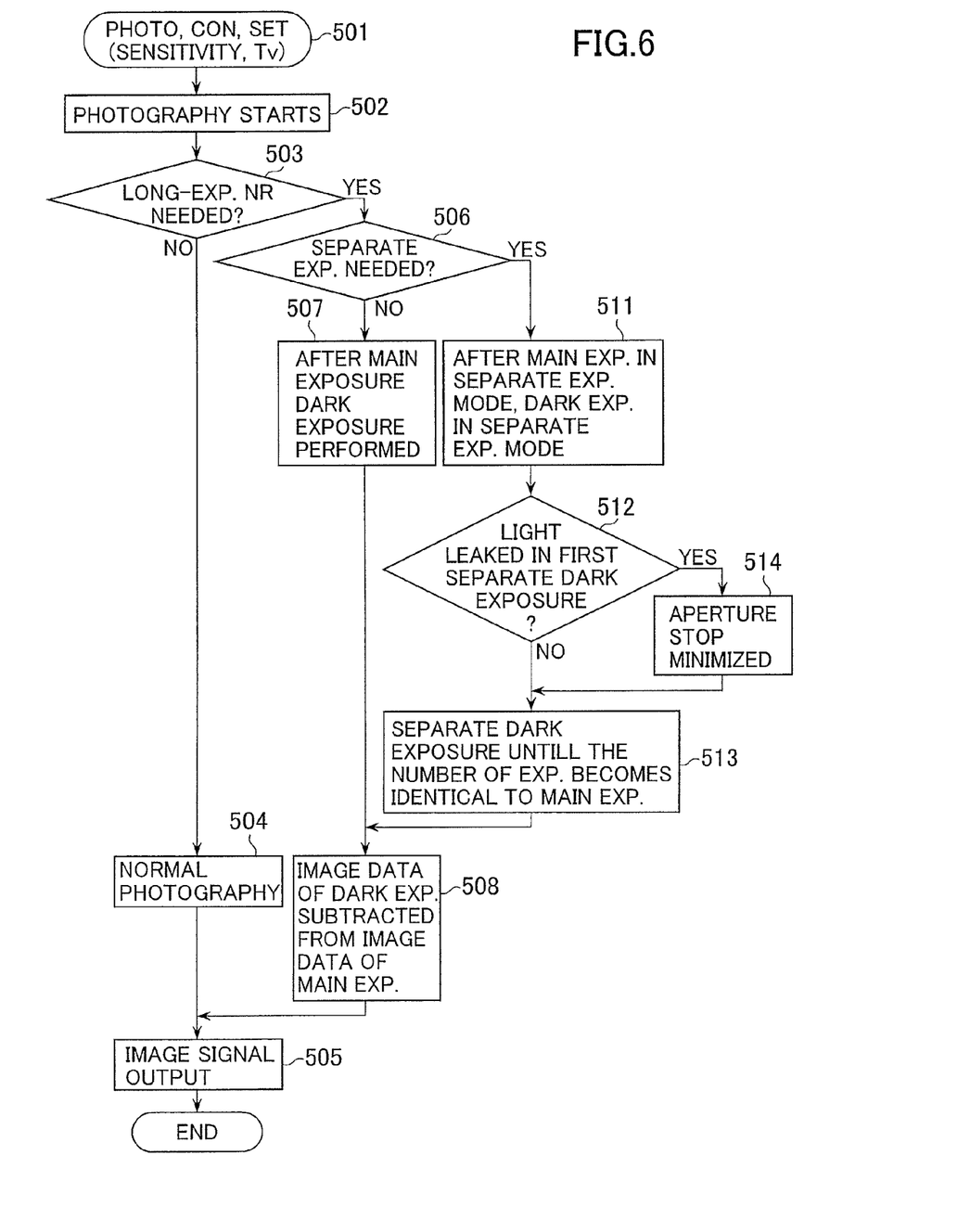
FIG. 6 is a flowchart of a control routine of a normal photographing mode in the third embodiment.

FIG. 6 is a flowchart of a control routine of a normal photographing mode in the third embodiment. Steps 501-505 are identical to Steps 301-305 in the second embodiment shown in FIG. 4.

When it is determined in Step 503 that the long-exposure NR is needed, the control routine proceeds to Step 506 where it is determined whether a separate exposure is to be performed. The separate exposure is an exposure of the imaging device 16 that is performed by dividing the exposure time electronically. For example, the single exposure time is set to 10 seconds, and an electrical charge signal is output from the imaging device 16 every time the single exposure is completed.

The necessity of the separate exposure is determined based on the exposure time of the imaging device 16, the sensitivity of the imaging device 16, and the temperature of the imaging device 16. For example, a threshold value of the exposure time is set using a predetermined calculation formula containing the sensitivity and the temperature, and whether or not the separate exposure is needed can then be determined using the threshold value.

When it is determined in Step 506 that the separate exposure is not needed, the control routine proceeds to Step 507 where a main exposure is carried out and a dark exposure is then performed while maintaining the opening degree of the aperture-stop 13. In Step 508, the image data of the dark exposure is subtracted from the image data of the main exposure in the DSP 41. The control routine then proceeds to Step 505 to complete the photography.

When it is determined in Step 506 that the separate exposure is needed, the control routine proceeds to Step 511 where the main exposure is carried out in the separate exposure mode. Although a dark exposure will be performed in the separate exposure mode by dividing the exposure time by the same number as the main exposure, the separate exposure of the dark exposure is performed only once in Step 511. The exposure time of the dark exposure in the separate exposure mode is shorter than the exposure time of the main exposure in the separate exposure mode, and image data (i.e., a noise component) corresponding to the one separate exposure in the main exposure is obtained by a calculation. In Step 512, image data corresponding to the dark exposure performed in Step 511 for the first time in the separate exposure mode is checked in the DSP 41 to determine whether or not light has leaked onto the imaging device 16. More specifically, when the number of pixels, in which pixel values exceed a predetermined threshold value, is greater than a predetermined value, it is determined that light has leaked onto the imaging device 16.

When it is determined in Step 512 that light has not leaked onto the imaging device 16, the control routine proceeds to Step 513 where the dark exposure is carried out in the separate exposure mode until the number of separate exposures becomes identical to that of the main exposure. In Step 508, the image data of the dark exposure is subtracted from the image data of the main exposure, and the subtraction is carried out on corresponding image data. For example, the image data of the second separate exposure of the dark exposure is subtracted from the image data of the second separate exposure of the main exposure. The control routine then proceeds to Step 505 to end the photography.

Conversely, when it is determined in Step 512 that light has leaked onto the imaging device 16, the control routine proceeds to Step 514 where the opening degree of the aperture-stop 13 is minimized to match the smallest opening degree from the second dark exposure in the separate exposure mode. The control routine then proceeds to Steps 513, 508, and 505 in this order to end the photography.

Figure 7:
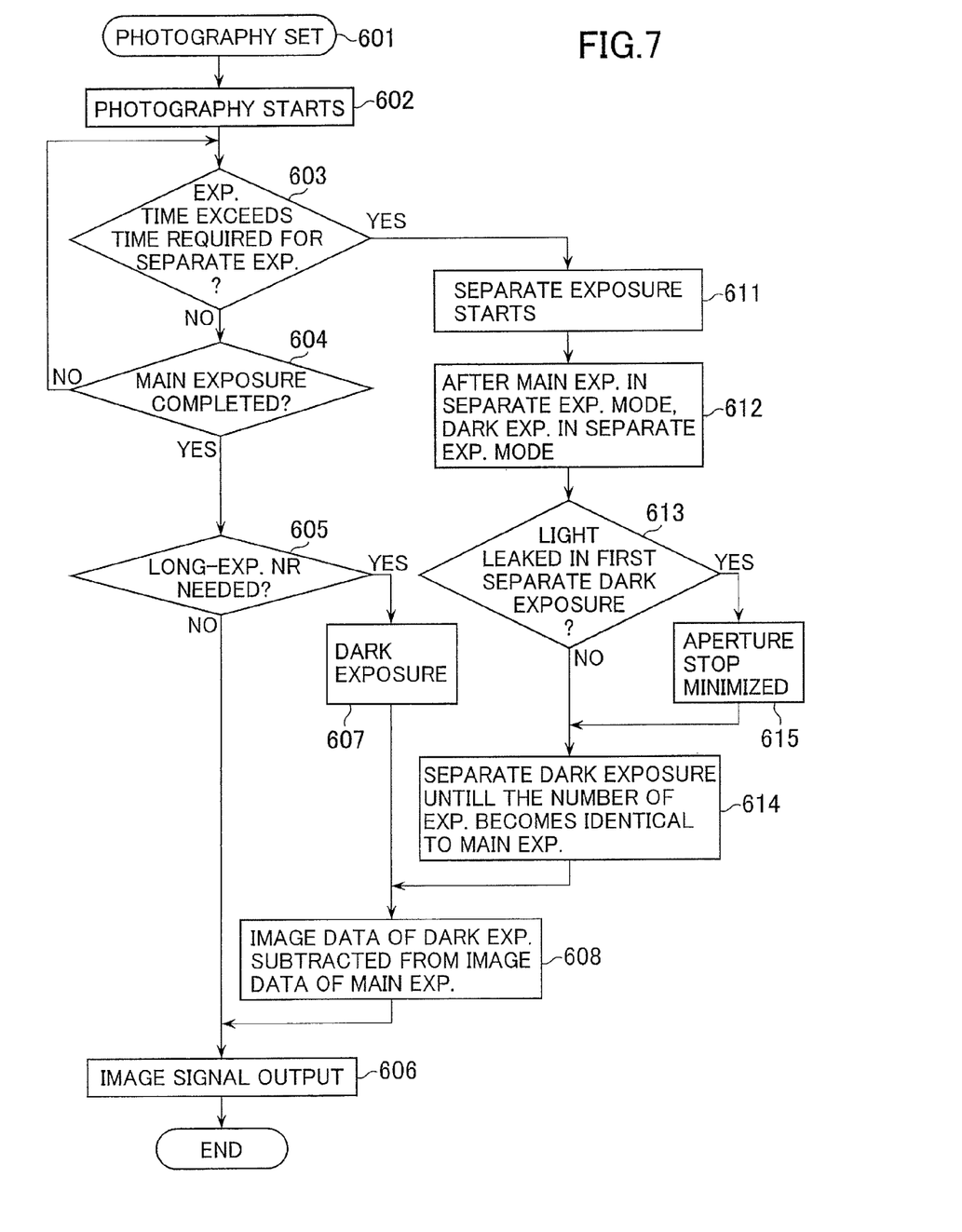
FIG. 7 is a flowchart of a control routine of a bulb photographing mode in the third embodiment.

FIG. 7 is a flowchart of a control routine of a bulb photographing mode in the third embodiment. In Step 601, the sensitivity of the imaging device 16 is set by using the operation member 32, and when the shutter button is fully depressed, the control routine proceeds to Step 602 to start photography. In Step 603, it is determined whether the exposure time exceeds a time required for performing a separate exposure. Step 603 is different from Step 506 of the second embodiment because the determination of whether or not the separate exposure is needed is based on only the exposure time of the imaging device 16. The reference value for the determination is 30 seconds, for example. When the exposure time is less than or equal to the reference value, the control routine proceeds to Step 604, where it is determined whether the main exposure is completed. Conversely, when the main exposure is not completed, the control routine goes back to Step 603.

Namely, while bulb photography is being carried out, the control routine returns repeatedly to Steps 603 and 604, which repeatedly executed until it is determined in Step 604 that the main exposure ends, then the control routine proceeds to Step 605, where it is determined whether or not the long-exposure NR is needed based on the photographing conditions. When the long-exposure NR is determined to be unnecessary, the control routine proceeds to Step 606 where an image signal is output from the imaging device 16 and subjected to image processing in the DSP 41 to end the photography.

When it is determined in Step 605 that the long-exposure NR is not needed, based on the photographing conditions such as the exposure time, the sensitivity, the temperature, and so on, the control routine proceeds to Step 607 where a dark exposure is performed while maintaining the opening degree of the aperture-stop 13 for the main exposure. The control routine proceeds to Steps 608 and 606 to end the photography.

When it is determined in Step 603 that the exposure time exceeds the reference value, the control routine proceeds to Step 611 where a separate exposure is started. That is, the main exposure is continually carried out, and Step 611 is continuously executed while the shutter button is continuously depressed. When the shutter button is released, the control routine proceeds to Step 612 where a dark exposure is started in the separate exposure mode. That is, in the bulb photographing mode, when the separate exposure is needed, the long-exposure NR should be carried out. On the other hand, the dark exposure in the bulb photographing mode is performed by dividing the exposure time by the same number as the main exposure, similarly to Step 511 of FIG. 6, but the separate exposure of the dark exposure is carried out only once in Step 612. The time of the separate exposure of the dark exposure is shorter than that of the main exposure, and the image data of the dark exposure is obtained by a calculation in a similar way as Step 511.

In Step 613, image data corresponding to the dark exposure performed in Step 612 for the first time in the separate exposure mode is checked in the DSP 41, to determine whether or not light has leaked onto the imaging device 16, in a similar way as Step 512. When it is determined in Step 613 that light has not leaked onto the imaging device 16, the control routine proceeds to Step 614 where the dark exposure is carried out in the separate exposure mode until the number of separate exposures becomes identical to that of the main exposure. The control routine then proceeds to Step 608 and 606 in this order to end the photography.

Conversely, when it is determined in Step 613 that light has leaked onto the imaging device 16, the control routine proceeds to Step 615 where the opening degree of the aperture-stop 13 is minimized to match the smallest opening degree from the second dark exposure in the separate exposure mode. The control routine proceeds to Steps 614, 608, and 606 in this order to end the photography.

As described above, according to the third embodiment, similarly to the first and second embodiments, light leaked onto the imaging device 16 can be restrained, so that the image quality of the photographed image ultimately obtained through the dark exposure control process is improved. Note that, in Steps 512 and 613 whether or not the opening degree of the aperture-stop 13 is minimized is determined based on the determination result of the light leaked in the first separate exposure in the dark exposure, the opening degree of the aperture-stop 13 may be minimized regardless of whether or not leaked light existed. Further, although image data obtained by the first separate exposure in the dark exposure is utilized in Steps 513 and 614, it is possible that, when light has leaked onto the imaging device 16, image data of the first separate exposure is deleted, and the opening degree of the aperture-stop 13 is minimized to re-obtain image data of the first separate exposure.

Furthermore, although the opening degree of the aperture-stop 13 is minimized in the first through third embodiments, the present invention is not restricted to this operation. For example, the opening space of the aperture-stop 13 may be made less than half the opening space set for the main exposure, or may be reduced more than the opening degree set for the main exposure.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2012-025574 (filed on Feb. 8, 2012) which is expressly incorporated herein, by reference, in its entirety.

What is claimed is:

1. A dark exposure control device provided in a camera having an imaging device and a shutter for controlling the exposure of the imaging device during a photographing operation, said dark exposure control device comprising:
   a dark exposure performing processor that detects an image signal generated by said imaging device while said shutter is closed during a dark exposure of the photographing operation;
   an aperture-stop that adjusts an amount of light incident on said imaging device; and
   an aperture-stop driving processor that adjusts an opening degree of said aperture-stop, wherein
   when the photographing operation is performed, a main exposure is first performed, in which the shutter is closed, and
   when the dark exposure control device determines that the dark exposure is required after the main exposure, the shutter is held closed, said dark exposure performing processor is operated, and said aperture-stop driving processor reduces an opening degree of said aperture-stop to be smaller than an opening degree of said aperture-stop set for the main exposure of the photographing operation.

2. The dark exposure control device according to claim 1, wherein said aperture-stop driving processor reduces an opening space of said aperture-stop to less than half an opening space set for the main exposure, while said dark exposure performing processor is operated.

3. The dark exposure control device according to claim 1, wherein said aperture-stop driving processor minimizes the opening degree of said aperture-stop, while said dark exposure performing processor is operated.

4. The dark exposure control device according to claim 1, further comprising a first dark exposure determining processor that determines whether said dark exposure performing processor is to be operated based on an exposure time of said imaging device, a sensitivity of said imaging device, and a temperature of said imaging device.

5. The dark exposure control device according to claim 4, wherein said aperture-stop driving processor reduces the opening degree of said aperture-stop when said first dark exposure determining processor determines that the sensitivity of said imaging device is higher than a predetermined value.

6. The dark exposure control device according to claim 1, further comprising a second dark exposure determining processor that determines whether said dark exposure performing processor is to be operated based on only an exposure time of said imaging device.

7. The dark exposure control device according to claim 1, further comprising a first separate exposure determining processor that determines whether the main exposure should be performed in a separate exposure mode, in which the exposure is performed by dividing an exposure time electronically based on an exposure time of said imaging device, a sensitivity of said imaging device, and a temperature of said imaging device, said dark exposure performing processor performing a dark exposure in said separate exposure mode by dividing the exposure time by the same number as the main exposure when said first separate exposure determining processor determines that the main exposure should be performed in said separate exposure mode.

8. The dark exposure control device according to claim 7, wherein said aperture-stop driving processor minimizes the opening degree of said aperture-stop while said dark exposure is performed in said separate exposure mode.

9. The dark exposure control device according to claim 7, further comprising a leaked light detection processor that determines whether light has leaked onto said imaging device when said dark exposure is performed for a first time in said separate exposure mode, said aperture-stop driving processor minimizes the opening degree of said aperture-stop to the smallest opening degree from a second dark exposure in said separate exposure mode, when said leaked light detection processor has determined that light has leaked onto said imaging device.

10. The dark exposure control device according to claim 1, further comprising a second separate exposure determining processor that determines whether the main exposure should be performed in a separate exposure mode, in which the exposure is performed by dividing an exposure time electronically based on only an exposure time of said imaging device, said dark exposure performing processor performing a dark exposure in said separate exposure mode by dividing the exposure time by the same number as the main exposure when said second separate exposure determining processor determines that the main exposure should be performed in a separate exposure mode.

11. The dark exposure control device according to claim 10, wherein said aperture-stop driving processor minimizes the opening degree of said aperture-stop while said dark exposure is performed in said separate exposure mode.

12. The dark exposure control device according to claim 10, further comprising a leaked light detection processor that determines whether light has leaked onto said imaging device when said dark exposure is performed for a first time in said separate exposure mode, said aperture-stop driving processor minimizes the opening degree of said aperture-stop after the first separate exposure when said leaked light detection processor has determined that light has leaked onto said imaging device.

* * * * *